United States Patent [19]

Schultz et al.

[11] 4,368,373

[45] Jan. 11, 1983

[54] APPARATUS FOR FABRICATING THROUGH-THE-PARTITION BATTERY CONNECTIONS

[75] Inventors: Carl D. Schultz, Tiffin; Robert D. Simonton, Fremont, both of Ohio

[73] Assignee: Mac Engineering & Equip. Co., Inc., Benton Harbor, Mich.

[21] Appl. No.: 178,808

[22] Filed: Aug. 18, 1980

[51] Int. Cl.³ .............................................. B23K 11/33
[52] U.S. Cl. .................................. 219/86.22; 219/89; 219/119; 219/149; 228/58
[58] Field of Search ................... 219/86.22, 78.16, 149, 219/150 R, 119, 89, 90; 29/623.1; 228/58

[56] References Cited

U.S. PATENT DOCUMENTS 1,982,098 11/1934 Hartmann ........................... 219/119
2,214,760 9/1940 Brown ................................. 219/119
3,897,269 7/1975 Sabatino et al. .
4,013,864 3/1977 Tiegel et al. .
4,046,062 9/1977 Matter et al. .
4,166,210 8/1979 Eberle ........................ 219/86.22 X Primary Examiner—Elliot A. Goldberg
Attorney, Agent, or Firm—Michael, Best & Friedrich

[57] ABSTRACT

An extruder and electrode assemblage for interconnecting the upstanding lugs of plate straps connected to the positive and negative grids of battery cell units through apertures provided in partitions, separating the cell units of a battery from each other. The electrode assemblage not only clamps the lugs against the partition but defines apertures for the extruding plungers to engage the lugs and extrude same into the partition aperture. Once the extruded lug portions contact each other, welding current is supplied thereto in a semi-annular path by the electrodes.

6 Claims, 4 Drawing Figures

APPARATUS FOR FABRICATING THROUGH-THE-PARTITION BATTERY CONNECTIONS

BACKGROUND OF THE INVENTION

1. Field of the Invention

This invention generally relates to fabricating equipment for electric storage batteries having a plurality of cell units wherein the cell units are electrically interconnected one with another through apertures provided in the insulating partitions separating the cell units and, more particularly, to an electric welding apparatus for effecting the forming and fusion of opposed plate connectors using an extruding and melting technique.

2. Description of the Prior Art

The use of through-the-partition connections is well known in the electric storage battery art and, although the apparatii used in the past have been commercially acceptable, they lack the prolonged life and freedom from adjustment required for use in high volume production lines. For example, in U.S. Pat. No. 4,046,062 issued to Matter on Sept. 6, 1977, there is disclosed an extruder-electrode unit which first extrudes portions of the partition separated lugs into an aperture in the partition and, when the extrusions contact one another, electric current is caused to flow through the extruder-electrode for fusing the contacting tips of the extrusions and softening the balance thereof until the partition aperture is filled and sealed. The problem herein is that the extruder-electrode is a unitary member made from a relatively soft electrically conducting material, such as cooper, which quickly wears and deforms and thus will not consistently extrude the required portions of the lugs into the apertures over prolonged periods of time. This, of course, necessitates frequent down time of the production line for changing or adjusting the extruder-electrode unit.

SUMMARY OF THE INVENTION

Briefly the improved extruder and electrode assemblage constructed in accordance with this invention overcomes the aforementioned problem by providing an electrode unit having a pair of opposed, relatively massive copper jaws for squeezing and fusing the lugs together and a separate extruder unit having a pair of opposed forging plungers which pass through apertures in the copper jaws for extruding portions of the lugs into the apertures of the partitions. To this end the extruder and electrode assemblage comprises a pair of opposite hand opposing jaws each pivotally mounted on a movable manifold block, and which are adapted to be pivotally moved, to-and-fro, by a common power cylinder. Welding current is supplied to the extruded lug portions in a semi-peripheral path. The extruder unit generally comprises a pair of opposing forging jaws or plungers, one pivotally mounted within each electrode jaw. Each forging jaw is fabricated of a hardened steel and adapted to be pivotally moved relative to its electrode jaw by a power cylinder. Insulating bearings and washers are provided between the pivotal connections for electrically insulating the various components of the extruder and electrode assemblage for each other.

OBJECTS AND ADVANTAGES

An object of this invention is to provide an improved extruder and electrode assemblage for fabricating a through-the-partition connection in an electric storage battery by an extrusion-fusion technique, which is simple in construction, reliable in operation, and has a prolonged life.

Another object of this invention is to provide an improved extruder and electrode assemblage for fabricating a through-the-partition connection in an electric storage battery wherein the extruder and electrode are separate units.

A further object of the invention is to provide an improved method of welding extruded portions of battery plate lugs.

Other objects and advantages of this invention will become more apparent during the course of the following description when read in connection with the accompanying drawings.

BRIEF DESCRIPTION OF THE DRAWINGS

In the drawings wherein like numerals are employed to designate like parts throughout the same.

DESCRIPTION OF THE PREFERRED EMBODIMENT

Figure 1:
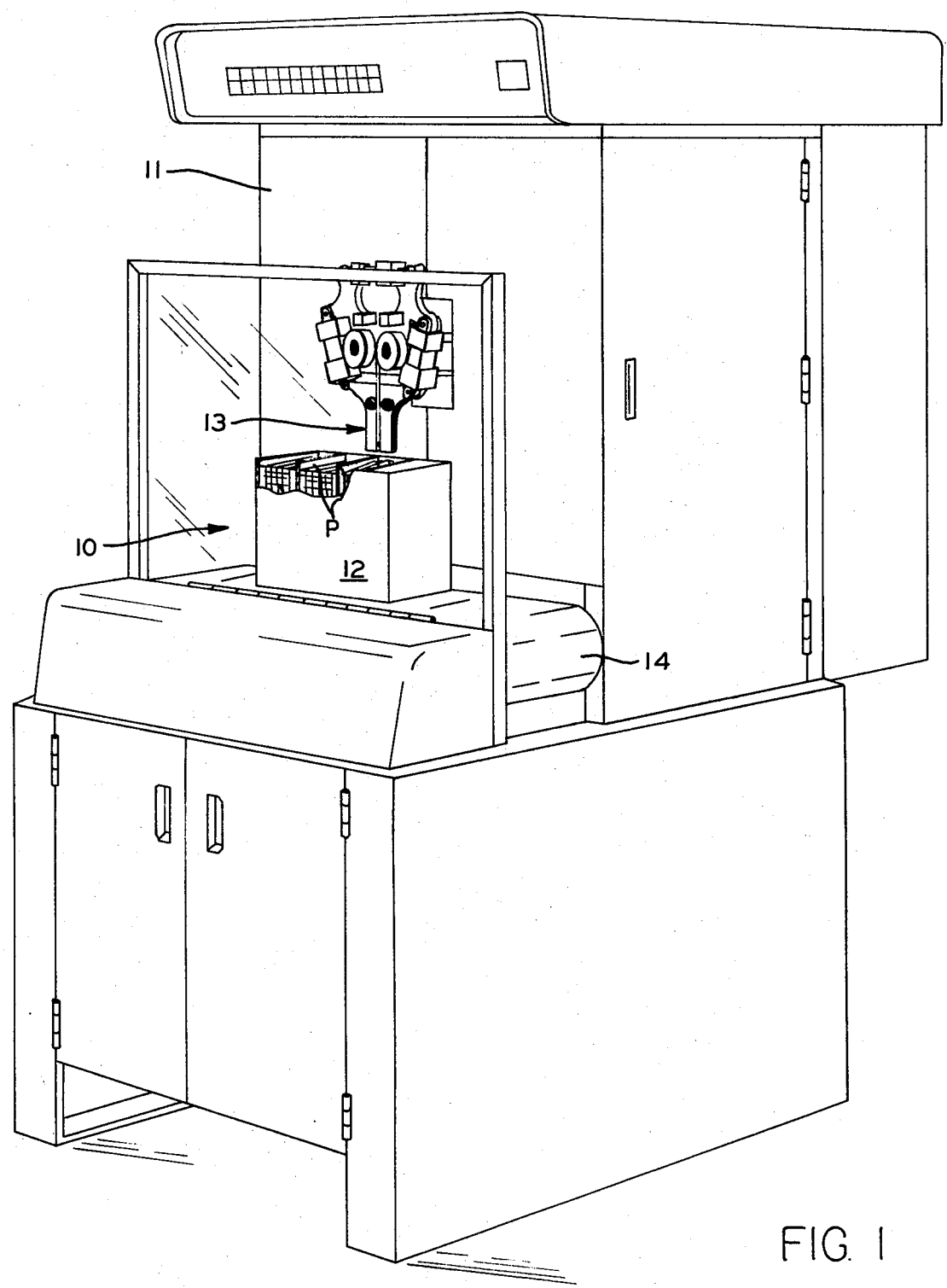
FIG. 1 is a perspective view illustrating the relationship of the component elements at a work station incorporating the extruder and electrode assemblage constructed in accordance with the invention.

Referring now to FIG. 1, there is illustrated a through-the-partition type welding work station 10 including a cabinet 11 containing the control elements. Briefly, a battery 12 is brought laterally into a position underlying a welding head assemblage constructed in accordance with the invention and designated in its entirety by the reference numeral 13, by a belt conveyor 14. The belt conveyor 14 may be operated by a stepping type electric motor (not shown) and the welding head 13 can be successively positioned relative to the partitions of the battery 12.

Figure 2:
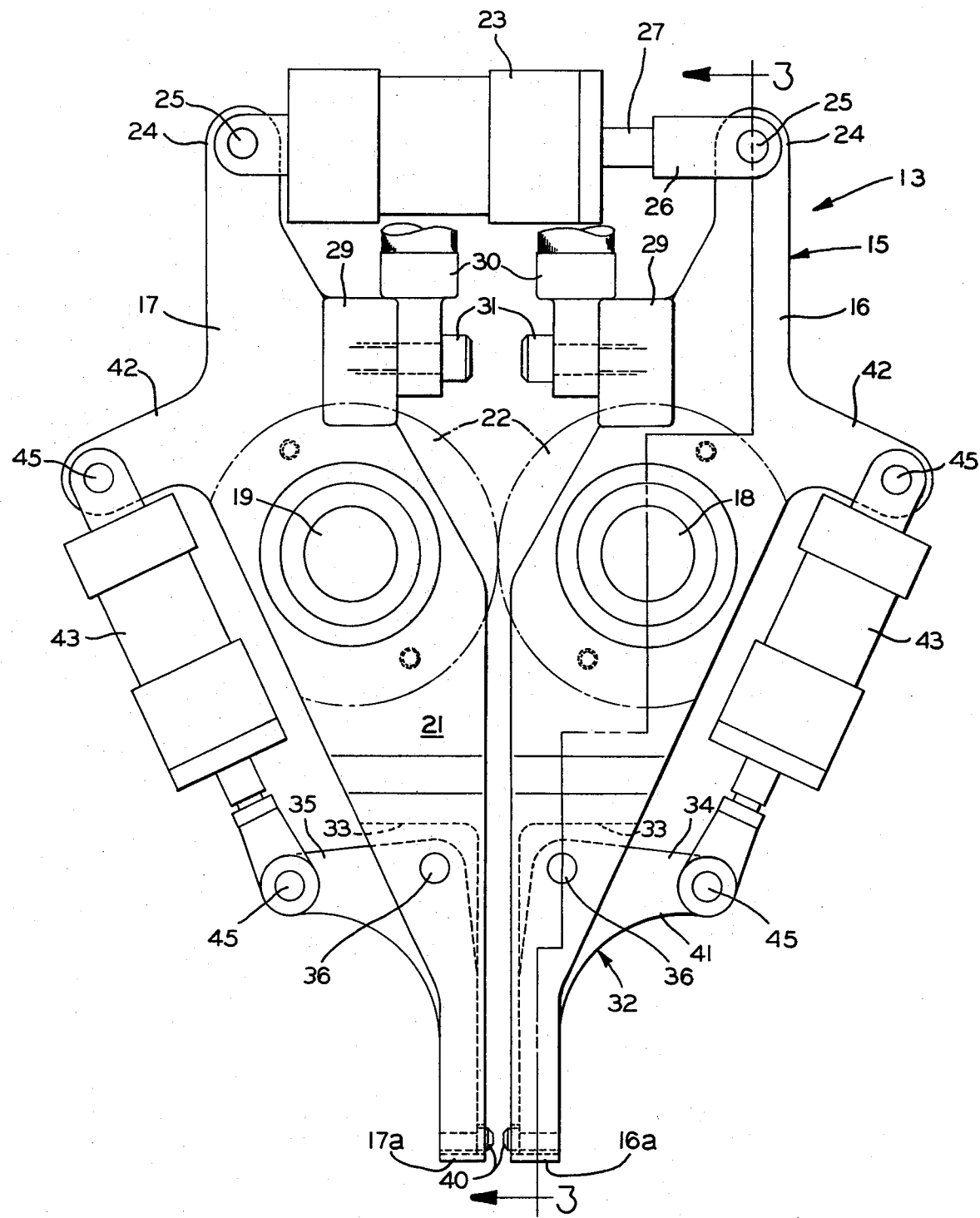
FIG. 2 is a plan view of the extruder and electrode assemblage incorporated in FIG. 1.
Figures 3, 4:
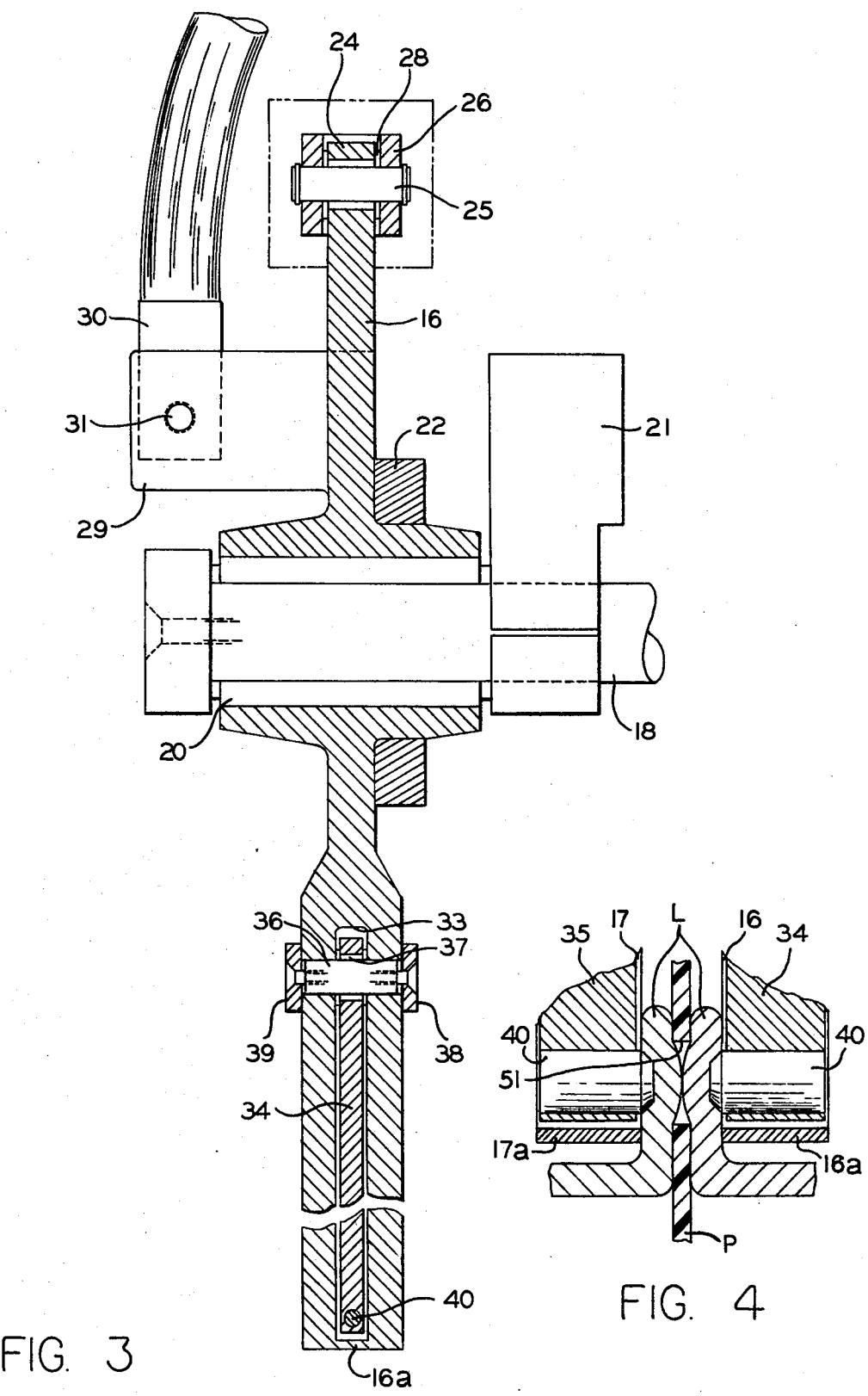
FIG. 3 is a cross-sectional view taken substantially along line 3—3 of FIG. 2.
FIG. 4 is a partial vertical sectional view illustrating the cooperation of the welding and extrusion jaws with the connector lugs.

As best illustrated in FIG. 2, the improved welding head assemblage 13 generally comprises an electrode unit 15 having a pair of opposed vertically extending opposite hand electrode jaws 16 and 17, each pivotally mounted between their ends on horizontally extending guide shafts 18 and 19, respectively, and are electrically insulated therefrom by an insulating bearing 20. Jaws 16 and 17 are fabricated from a high electrically conductive material such as copper or a copper alloy and have liberal cross sections to provide low electrical resistance. As illustrated in FIG. 3, the guide shafts 18 and 19 are conventionally anchored in a movable manifold block 21, which is movable vertically and back and forth to successively align jaws 16 and 17 at the required positions for effecting welds.

Each electrode jaw 16 and 17 is provided with a gear 22 which may be a sector gear and fabricated from a non-conducting electrical material. Each gear 22 is mounted on its respective electrode jaw about its pivot axis by cap screws (not shown) and are in constant mesh with each other for synchronizing the rotational movement of the lower ends 16a and 17a of the welding jaws 16 and 17 for applying a controlled compressive force between the opposed faces of the jaws.

The pivotal movement of the jaws 16 and 17 is provided by a conventionally operated fluid cylinder 23, the ends of which are pivotally attached to pins 25 which are mounted in tangs 24 extending from the upper end of each jaw 16 and 17. A clevis 26 attached to the piston rod 27 of the power cylinder is electrically insulated from the tang 24 extending from the jaw 16 by a conventional insulator bearing and washer arrangement 28 (see FIG. 3). A massive projecting lug 29 is provided on each jaw 16 and 17 for attachment of an electrical conductor 30 such as by a cap screw 31.

Also, in accordance with the invention, the lower end of electrode unit 15 is provided with an extruding unit 32. More specifically, each electrode jaw 16 and 17 is provided with an elongated deep groove 33 for receiving an opposite hand forging jaw such as bell cranks 34 and 35, respectively. Groove 33 terminates above the bottom portions 16a and 17a. Each bell crank 34 and 35 is pivotally mounted intermediate its ends in groove 33 by a pivot pin 36 and a bearing 37.

Means are provided for electrically insulating the extruding or forging jaws 34 and 35 from the electrode jaws 16 and 17. Thus, in the illustrated construction each bell crank 34 and 35 is electrically insulated from its respective electrode jaw by a pair of insulator washers 38 and 39 (see FIG. 3). The lower end of each bell crank 34 and 35 is provided with a forging pin 40 fabricated from a hardened material for extruding the battery plate lugs L (FIG. 4) through the aperture 51 of the battery partition P. Extrusion movement of each bell crank 34 and 35 is provided by a power cylinder such as the power cylinder 43, the ends of which are pivotally attached between an arm 41 of the bell cranks 34 and 35 and projections 42 extending from the electrode jaws 16 and 17, by pivot pins such as the pins 45.

Referring particularly to FIG. 4, the welding head assemblage is moved to a position wherein the lower portions of the welding jaws 16 and 17 are respectively disposed on opposite sides of the aperture 51 in partition P and engage the connector lugs L in clamping relation, with bottom portions 16a and 17a located beneath aperture 51, maintaining a firm force against those lugs to hold them firmly in engagement with the sides of partition P. The cylinders 43 of the extruding mechanism 32 are then actuated to drive the forging plungers 40 towards each other, thus extruding a portion of the lugs L into the aperture 51 until such extruded portions contact each other. At this point, a circuit is completed for the flow of welding current from the supply lines 30 through the electrode connections 29 and the respective welding arms 16 and 17 and then semi-peripherally around the plungers 40 into the extruded portions of the lugs L, resulting in a semi-annular concentration of current flow in the lower portions of the extruded portions. While the exact phenomena involved in utilizing such semi-annular flow of current into the extruded lug portions is not clearly understood, it has been observed that more consistent and better quality lug welds are produced by thus directing the current into the extruded portions of lug L. The contacting portions of the lugs L quickly melt and rapidly fill the remaining portion of the partition aperture 51 to achieve not only a low resistance connection of the lugs L but a complete sealing of the aperture 51 in the partition P.

Thus this invention provides a unique method of applying welding current to the extruded contacting portions of the battery lugs. One could speculate that the semi-annular current path provided by the unique configuration of the bottom ends 16a and 17a of the electrode jaws provides a surplus of current flowing through the lower portions of the extruded portions of the lugs. Such lower portions are, of course, subjected to greater cooling by virtue of being connected to the main lug body. Hence, these more difficult to melt portions of the connecting lugs may, through the application of the semi-annular current flow, be caused to melt more rapidly than is the case when the current is applied directly through the extruding or forging plungers 40, as has been the case in prior art devices.

It is to be understood that the form of the invention herewith shown and described is to be taken as an illustrative embodiment only of the same, and that various changes in the shape, size and arrangement of the parts may be resorted to without departing from the spirit of the invention.

What is claimed is:

1. A welding head assemblage for interconnecting the upstanding lugs of plate straps connected to the positive and negative grids of adjacent battery cell units through an aperture provided in a partition separating the cell units from each other, the welding head assemblage comprising: an electrode unit having a pair of opposed high conductivity electrode jaws adapted to fit about the partition and into the adjacent cell units and overlie the upstanding lugs, each jaw having therein an aperture aligned with the partition aperture; means for moving said electrode jaws relatively toward each other for compressing the upstanding lugs against the partition; an extruding jaw movably mounted relative to each said electrode jaw and having a forging plunger adapted to pass through said electrode jaw aperture; means for electrically insulating said extruding jaws from said electrode jaws; means for moving said extruding jaws relatively towards each other and relative to said electrode jaws for extruding a portion of each upstanding lug into the partition aperture and into contact with each other; and means for passing an electric current through said electrode jaws, and without passing current through said extruding jaws, for fusing together the contacting portions of the upstanding lugs and filling the partition aperture so as to form a sealed connection between the cell units of the battery.

2. A welding head assemblage for interconnecting the upstanding lugs of plate straps connected to the positive and negative grids of adjacent battery cell units through an aperture provided in a partition separating the cell units from each other, said welding head assemblage comprising an electrode unit having a pair of opposed high conductivity electrode jaws adapted to fit about the partition and into the adjacent cell units and overlie the upstanding lugs, each jaw having therein an aperture aligned with the partition aperture; said electrode jaws being pivotally mounted intermediate their ends and including means for rotationally moving said electrode jaws in unison relative to each other so as to press the upstandding lugs against the partition; an extruding jaw movably mounted relative to each said electrode jaw and having a forging plunger adapted to pass through said electrode jaw aperture; means for moving said extruding jaws relatively towards each other and relative to said electrode jaws for extruding a portion of each upstanding lug into the partition aperture and into contact with each other; and means for passing an electric current through said electrode jaws for fusing together the contacting portions of the upstanding lugs and filling the partition aperture so as to form a sealed connection between the cell units of the battery.

3. A welding head assemblage for interconnecting the upstanding lugs of adjacent battery cell units together as claimed in claim 2 wherein said means for rotationally moving said electrode jaws in unison with each other comprises intermeshing gears, one attached to each said electrode jaw.

4. A welding head assemblage for interconnecting the upstanding lugs of plate straps connected to the positive and negative grids of adjacent battery cell units through an aperture provided in a partition separating the cell units from each other, said welding head assemblage comprising an electrode unit having a pair of opposed high conductivity electrode jaws adapted to fit about the partition and into the adjacent cell units and overlie the upstanding lugs, each jaw having an end and having therein an aperture spaced from said end and aligned with the partition aperture; means for moving said electrode jaws relatively toward each other so as to press the upstanding lugs against the partition; said means for moving said electrode jaws relatively to each other comprising a power cylinder attached to and extending between said ends of said electrode jaws, and extruding jaw movably mounted relative to each said electrode jaw and having a forging plunger adapted to pass through said electrode jaw aperture; means for moving said extruding jaws relatively towards each other and relative to said electrode jaws for extruding a portion of each upstanding lug into the partition aperture and into contact with each other; and means for passing an electric current through said electrode jaws for fusing together the contacting portions of the upstanding lugs and filling the partition aperture so as to form a sealed connection between the cell units of the battery.

5. A welding head assemblage for interconnecting the upstanding lugs of plate straps connected to the positive and negative grids of adjacent battery cell units through an aperture provided in a partition separating the cell units from each other, said welding head assemblage comprising an electrode unit having a pair of opposed high conductivity electrode jaws adapted to fit about the partition and into the adjacent cell units and overlie the upstanding lugs, each jaw having therein an aperture aligned with the partition aperture; means for moving said electrode jaws relatively toward each other for pressing the upstanding lugs against the partition; an extruding jaw movably mounted relative to each said electrode jaw and having a forging plunger adapted to pass through said electrode jaw aperture; means for moving said extruding jaws relatively towards each other and relative to said electrode jaws for extruding a portion of each upstanding lug into the partition aperture and into contact with each other and comprising a power cylinder having one end pivotally attached to the associated one of said extruding jaws and another end pivotally attached to the associated one of said electrode jaws, means for passing an electric current through said electrode jaws for fusing together the contacting portion of the upstanding lugs and filling the partition aperture so as to form a sealed connection between the cell units of the battery.

6. A welding head assemblage for interconnecting the upstanding lugs of plate straps connected to the positive and negative grids of adjacent battery cell units through an aperture provided in a partition separating the cell units from each other, said welding head assemblage comprising an electrode unit having a pair of opposed high conductivity electrode jaws adapted to fit about the partition and into the adjacent cell units and overlie the upstanding lugs, each jaw having an upper end and having therein an aperture spaced from said upper end and aligned with the partition aperture, and each of said electrode jaws being pivotally mounted intermediate their ends and including means for rotationally moving said jaws in unison relative to each other for pressing the upstanding lugs against the partition and comprising intermeshing gears, one attached to each said electrode jaw, and a power cylinder attached to and extending between said upper ends of said electrode jaws, an extruding jaw movably mounted relative to each said electrode jaw and having a forging plunger adapted to pass through said electrode jaw aperture, means for moving said extruding jaws relatively towards each other and relative to said electrode jaws for extruding a portion of each upstanding lug into the partition aperture and into contact with each other, each of said means for moving said extruding jaw comprising a power cylinder having one end pivotally attached to the associated one of said extending jaws and another end pivotally attached to the associated one of said electrode jaws, and means for passing an electric current through said electrode jaws for fusing together the contacting portions of the upstanding lugs and filling the partition aperture so as to form a sealed connection between the cell units of the battery.

* * * * *